(12) United States Patent
Smith et al.

(10) Patent No.: US 8,661,075 B2
(45) Date of Patent: Feb. 25, 2014

(54) METHOD AND APPARATUS FOR SERVING EPISODIC SECONDARY CONTENT

(75) Inventors: Allen Smith, San Diego, CA (US);
Daniel M. Rivas, El Cajon, CA (US);
Per O. Nielsen, Chula Vista, CA (US);
Susan J. McGarry, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 386 days.

(21) Appl. No.: 12/478,582

(22) Filed: Jun. 4, 2009

(65) Prior Publication Data
US 2010/0312824 A1 Dec. 9, 2010

(51) Int. Cl.
*G06F 15/16* (2006.01)
*H04N 7/10* (2006.01)
*G06Q 30/00* (2012.01)

(52) U.S. Cl.
USPC .......... 709/203; 709/217; 709/218; 709/219; 725/32; 705/14.4

(58) Field of Classification Search
USPC .................. 705/10, 32, 14.49, 14.33, 14.55; 725/86, 87, 32–36; 709/231, 232, 217, 709/219
See application file for complete search history.

(56) References Cited

U.S. PATENT DOCUMENTS

| 6,434,747 | B1 | 8/2002 | Khoo et al. | |
|---|---|---|---|---|
| 2002/0046103 | A1 | 4/2002 | Rudolph | |
| 2006/0271425 | A1* | 11/2006 | Goodman et al. | 705/14 |
| 2007/0261072 | A1 | 11/2007 | Boulet et al. | |
| 2008/0004960 | A1* | 1/2008 | Coomer et al. | 705/14 |
| 2008/0010117 | A1* | 1/2008 | Oliveira et al. | 705/14 |
| 2008/0271067 | A1* | 10/2008 | Li et al. | 725/32 |
| 2009/0070190 | A1* | 3/2009 | Gorty et al. | 705/10 |
| 2009/0076898 | A1* | 3/2009 | Wang et al. | 705/14 |
| 2009/0228920 | A1* | 9/2009 | Tom et al. | 725/35 |
| 2009/0319373 | A1* | 12/2009 | Barrett | 705/14.55 |
| 2010/0057570 | A1* | 3/2010 | Barsook et al. | 705/14.55 |
| 2010/0146566 | A1* | 6/2010 | Taylor et al. | 725/87 |
| 2011/0016479 | A1* | 1/2011 | Tidwell et al. | 725/9 |

FOREIGN PATENT DOCUMENTS

WO WO2007082190 7/2007

OTHER PUBLICATIONS

International Search Report and Written Opinion—PCT/US2010/037484, International Search Authority—European Patent Office—Oct. 7, 2006.

* cited by examiner

*Primary Examiner* — Joseph Avellino
*Assistant Examiner* — Aftab Nasir Khan
(74) *Attorney, Agent, or Firm* — The Marbury Law Group, PLLC

(57) ABSTRACT

Methods, apparatus, systems and computer program products are presented for providing episodic secondary content to a mobile device. The present aspects provide for: receiving at least one of the plurality of episodic secondary content items an episodic secondary content set and an episodic manifest, the episodic manifest including indexes coupling at least two episodic secondary content items from the episodic secondary content set, presenting an initial episodic secondary content item during a predetermined break in presentation of a primary content item, prompting a user to select an additional episodic secondary content item from the set, the plurality of episodic secondary content items coupled to the initial episodic secondary content item and determined by the episodic manifest, and receiving a user selection of the additional episodic secondary content item to be presented during a subsequent predetermined break in presentation of the primary content item.

90 Claims, 7 Drawing Sheets

METHOD AND APPARATUS FOR SERVING EPISODIC SECONDARY CONTENT

BACKGROUND

Mobile broadcast networks have been designed to deliver media content, to wireless communication devices, such as cellular telephones and the like. Mobile broadcast networks are especially suited for delivering primary programming content interspersed with secondary or advertising media content. Secondary content may be referred to as advertisements or ads.

Mobile broadcast networks may utilize broadcast or multicast delivery systems transmit content to multiple recipients at the same time. Examples of mobile broadcast systems include FLO, DVB-H, 1Seg, and CDMA2000 Multimedia Broadcast Multicast Service (MBMS). Some of these systems also employ a unicast delivery system, such as CDMA or GSM based system as a supplemental communication system to such tasks as subscriptions and encryption key distribution.

For convenience and clarity, unicast as used herein refers to sending information packets to a single destination. While such transmissions may be picked up by multiple receivers, only the addressed receiver digests the data. Physically, messages are directed only over those links in a network required to achieve delivery, thereby limiting the number of devices on the network that actually receive the messages to a minimum. Unicast allows a single user to personalize receiving data on the fly. Web browsing to a particular streamed media clip is an example of unicasting.

Multicast as used herein refers to transmitting information packets addressed to a range of receivers. Multicast is typically implemented on an otherwise unicast-based network using network addressing methods for the delivery of information to a group of destinations simultaneously. Multicast methods strive for efficiency through delivering the messages over each link of the network only once, creating copies only when the links to the multiple destinations split, typically at network switches and routers. Multicast is often used for streaming media and Internet television applications where the media is streamed to all requesting users in the same time frame. An example is a group selecting to receive streaming video of a live performance or sports contest.

Broadcast as used herein refers to transmitting information, which in some but not all instances can be packetized, to all units capable of receiving the transmission without distinction. Over-the-air television and radio are particular examples of broadcast networks. For example, everybody tuned to channel 8 receives the same signal at the same time with the transmission time chosen by the broadcaster rather than the user. Broadcast networks are usually physically separate from unicast based networks as, generally, one-to-many transmissions of data is not efficient on a unicast based network. Broadcast networks are also generally thought of as being one-way communication paths.

With respect to the distribution of secondary content, content providers are highly interested in providing targeted media content to users of wireless devices. Targeted media refers to media content, such as advertisements, delivered to wireless devices of those users which have (or should have) an interest in the media content. Targeted content delivery has, in many instances, involved centrally acquiring and analyzing user profile data and/or user usage behavior data to determine which media content would interest the user. The targeted media content is then bundled and sent to the wireless device of the user.

Targeting media content is generally complex, in terms of communication requirements, in that it requires multiple and persistent communications from the wireless device to a server to accumulate and update the user profile and/or usage behavior files. Additionally, targeted media content delivery tends to be costly requiring additional software, a large amount of back-end servers to store user profiles and/or usage behavior data, and the use of more network resources for delivering the targeted content. In addition to complexity and cost concerns, privacy issues are of concern because users of wireless devices may not desire to have the content service providers maintain active profiles of the user and/or the user's usage behavior.

Therefore, a need exists to develop a method for enhancing the presentation of the secondary content so as to engage the user to interact with the secondary content, and thereby gather information corresponding to the interaction to further optimize targeting of the secondary content.

SUMMARY

The following presents a simplified summary of one or more aspects. This summary is not an extensive overview of all contemplated aspects, and is intended to neither identify key or critical elements of all aspects nor delineate the scope of any or all aspects. The sole purpose of the summary is to present some concepts of one or more aspects in a simplified form as a prelude to a more detailed description.

In accordance with one or more aspects and corresponding disclosure thereof, various aspects are described in connection with serving episodic secondary content in a mobile device to a mobile device. According to one aspect, a method for serving episodic secondary content in a mobile device is provided. The method can comprise receiving, in the mobile device, a plurality of episodic secondary content items corresponding to an episodic secondary content set and an episodic manifest, the episodic manifest including indexes coupling at least two episodic secondary content items from the episodic secondary content set, presenting an initial episodic secondary content item during a predetermined break in presentation of a primary content item on the mobile device, prompting a user of the mobile device to select an additional episodic secondary content item from the set the plurality of episodic secondary content items coupled to the initial episodic secondary content item and determined by the episodic manifest, and receiving a user selection of the additional episodic secondary content item to be presented during a subsequent predetermined break in presentation of the primary content item on the mobile device.

Another aspect relates to an apparatus. The apparatus can include a communications module for receiving a plurality of episodic secondary content items corresponding to an episodic secondary content set and an episodic manifest, the episodic manifest including indexes coupling at least two episodic secondary content items from the episodic secondary content set; and a user interface for: presenting an initial episodic secondary content item during a predetermined break in presentation of a primary content item, prompting a user to select an additional episodic secondary content item from the set, the plurality of episodic secondary content items coupled to the initial episodic secondary content item and determined by the episodic manifest, and receiving a user selection of the additional episodic secondary content item to be presented during a subsequent predetermined break in presentation of the primary content item.

Yet another aspect relates to at least one processor configured to manipulate web content to present substantially uniform content to a client. The at least one processor can include a first module for receiving, in the mobile device, a plurality of episodic secondary content items corresponding to an episodic secondary content set and an episodic manifest, the episodic manifest including indexes coupling at least two episodic secondary content items from the episodic secondary content set, a second module for presenting an initial episodic secondary content item during a predetermined break in presentation of a primary content item on the mobile device, a third module for prompting a user of the mobile device to select an additional episodic secondary content item from the set, the plurality of episodic secondary content items coupled to the initial episodic secondary content item and determined by the episodic manifest, and a fourth module for receiving a user selection of the additional episodic secondary content item to be presented during a subsequent predetermined break in presentation of the primary content item on the mobile device.

Still another aspect relates to a computer program product comprising a computer-readable medium. The computer-readable medium can include a first set of codes for causing a computer to receive a plurality of episodic secondary content items corresponding to an episodic secondary content set and an episodic manifest, the episodic manifest including indexes coupling at least two episodic secondary content items from the episodic secondary content set, a second set of codes for causing the computer to present an initial episodic secondary content item during a predetermined break in presentation of a primary content item, a third set of codes for causing the computer to prompting a user to select an additional episodic secondary content item from the set, the plurality of episodic secondary content items coupled to the initial episodic secondary content item and determined by the episodic manifest, and a fourth set of codes for causing the computer to receive a user selection of the additional episodic secondary content item to be presented during a subsequent predetermined break in presentation of the primary content item on the mobile device.

Yet another aspect relates to an apparatus. The apparatus can include means for receiving, in the mobile device, a plurality of episodic secondary content items corresponding to an episodic secondary content set and an episodic manifest, the episodic manifest including indexes coupling at least two episodic secondary content items from the episodic secondary content set, means for presenting an initial episodic secondary content item during a predetermined break in presentation of a primary content item on the mobile device, means for prompting a user of the mobile device to select an additional episodic secondary content item from the set, the plurality of episodic secondary content items coupled to the initial episodic secondary content item and determined by the episodic manifest, and means for receiving a user selection of the additional episodic secondary content item to be presented during a subsequent predetermined break in presentation of the primary content item on the mobile device.

According to one aspect, a method for providing episodic secondary content to a mobile device is provided. The method can comprise transmitting, to the mobile device, a plurality of episodic secondary content items corresponding to an episodic secondary content set and an episodic manifest, the episodic manifest including indexes coupling at least two episodic secondary content items from the episodic secondary content set, transmitting a primary content item to the mobile device, the primary content item including a predetermined break in the presentation to allow the mobile device to present an initial secondary content item, and receiving aggregated data from the mobile device including data associated with a user selection of at least one of the plurality of episodic secondary content items and data associated with at least one of the plurality of episodic secondary content items.

Another aspect relates to an apparatus. The apparatus can include a communications module configurable to: transmit, to the mobile device, a plurality of episodic secondary content items corresponding to an episodic secondary content set and an episodic manifest, the episodic manifest including indexes coupling at least two episodic secondary content items from the episodic secondary content set, transmit a primary content item to the mobile device, the primary content item including a predetermined break in the presentation to allow the mobile device to present an initial secondary content item, and receive aggregated data from the mobile device including data associated with a user selection of at least one of the plurality of episodic secondary content items and data associated with at least one of the plurality of episodic secondary content items.

Yet another aspect relates to at least one processor configured to manipulate web content to present substantially uniform content to a client. The at least one processor can include a first module for transmitting, to the mobile device, a plurality of episodic secondary content items corresponding to an episodic secondary content set and an episodic manifest, the episodic manifest including indexes coupling at least two episodic secondary content items from the episodic secondary content set, a second module for transmitting a primary content item to the mobile device, the primary content item including a predetermined break in the presentation to allow the mobile device to present an initial secondary content item, and a third module for receiving aggregated data from the mobile device including data associated with a user selection of at least one of the plurality of episodic secondary content items and data associated with at least one of the plurality of episodic secondary content items.

Still another aspect relates to a computer program product comprising a computer-readable medium. The computer-readable medium can include a first set of codes for causing a computer to transmit, to the mobile device, a plurality of episodic secondary content items corresponding to an episodic secondary content set and an episodic manifest, the episodic manifest including indexes coupling at least two episodic secondary content items from the episodic secondary content set, a second set of codes for causing the computer to transmit a primary content item to the mobile device, the primary content item including a predetermined break in the presentation to allow the mobile device to present an initial secondary content item, and a third set of codes for causing the computer to receive aggregated data from the mobile device including data associated with a user selection of at least one of the plurality of episodic secondary content items and data associated with at least one of the plurality of episodic secondary content items.

Yet another aspect relates to an apparatus. The apparatus can include means for transmitting, to the mobile device, an episodic secondary content set and an episodic manifest, a plurality of episodic secondary content items corresponding to the episodic manifest including indexes coupling at least two episodic secondary content items from the episodic secondary content set, means for transmitting a primary content item to the mobile device, the primary content item including a predetermined break in the presentation to allow the mobile device to present an initial secondary content item, and means for receiving aggregated data from the mobile device including data associated with a user selection of at least one of the plurality of episodic secondary content items and data associated with at least one of the plurality of episodic secondary content items.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Various aspects are now described with reference to the drawings. In the following description, for purposes of explanation, numerous specific details are set forth to provide a thorough understanding of one or more aspects. It may be evident, however, that such aspect(s) may be practiced without these specific details.

Content generated for mobile devices may be generally subdivided into two types: Primary content, which may include, movies, television shows, audio albums, etc.; and, secondary content, which may include, advertisements, and the like. A user may choose to present primary content through a wireless device, and as part of the condition of presentation of the primary content, secondary content may be presented, before, during, or after the presentation of the primary content.

Breaks may be placed throughout the presentation of the primary content to allow the mobile device to present secondary content. Secondary content may be presented in an episodic and interactive manner. The term "episodic" generally refers to the presentation of a series of items that at least in part logically correspond to each other. For example, an initial secondary content item may include the beginning of a story line. Subsequent secondary content items may be presented during future breaks in the presentation of the primary content item that continue the story line of the initial secondary content. The term "interactive" generally refers to allowing a user to direct a story line. For example, after the initial secondary content item is presented, the user may be prompted to select from among various possible plot paths. Generally speaking each plot path will have a piece of secondary content associated therewith. The selection process may be repeated after each piece of secondary content is presented to the user. Because the story line is directed by the user, the user level of interest likely increases as the story line progresses.

Figure 1:
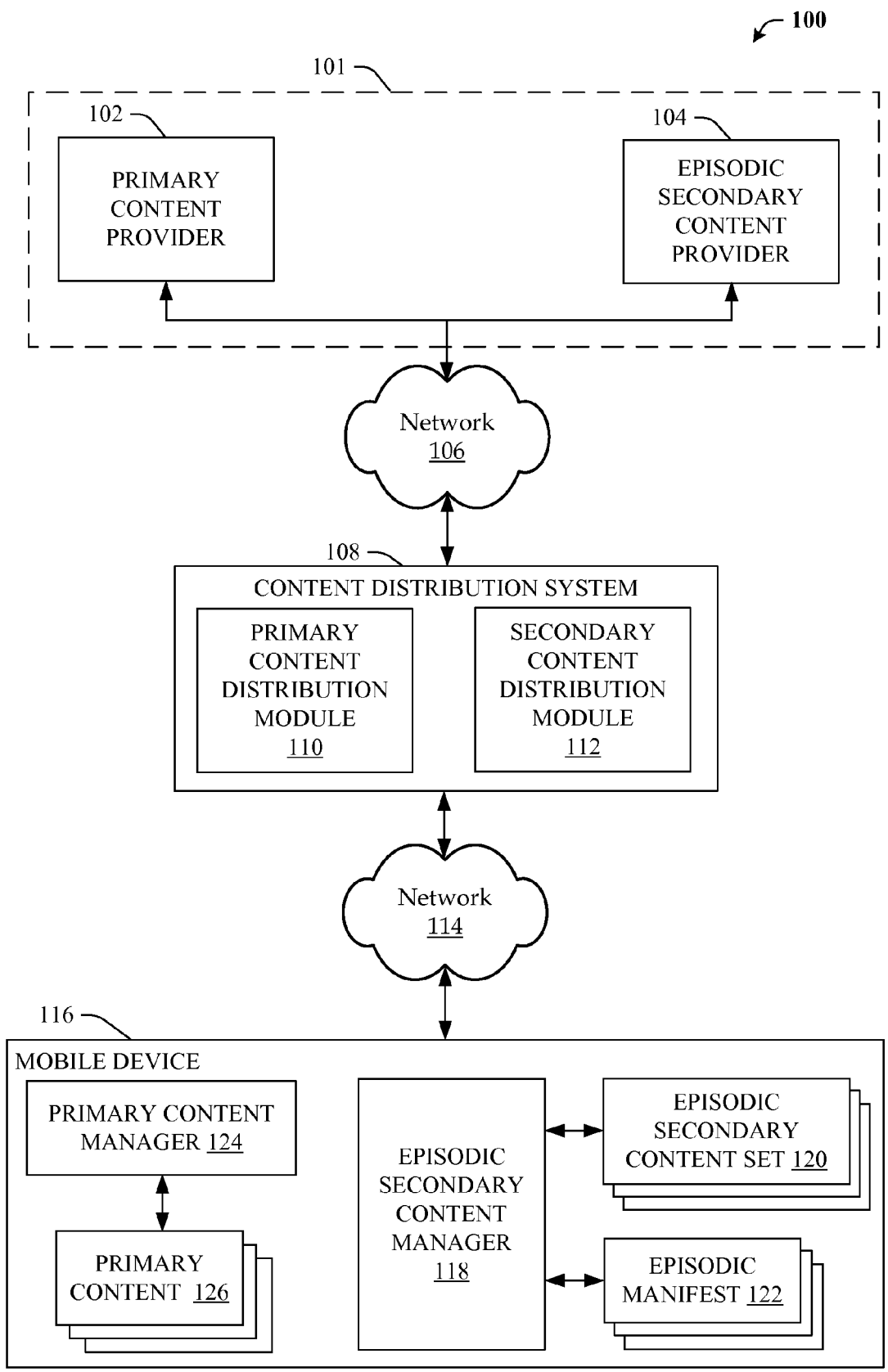
FIG. 1 illustrates a block diagram of an exemplary communication system that can facilitate serving episodic secondary content in a mobile device.

Referring now to FIG. 1, illustrated is a block diagram of an exemplary communication system 100 that can facilitate serving episodic secondary content to a plurality of mobile device—one of which the mobile device 116 is illustrated. Communication system 100 may include content providers 101 for both primary content 102 and episodic secondary content 104. Content providers 101 communicate with a content distribution system 108 via network 106. The network 106 may comprise one or more of a leased telecommunication line, a LAN, a Wireless LAN, a MAN, a WAN (such as the Internet), a WWAN, or the like.

Communication system 100 includes one or more network devices, such as servers, databases and the like. Content distribution system 100 includes primary a content distribution module 110 and a secondary content distribution module 112. The primary content distribution module 110 may provide for unicast delivery, broadcast delivery, multicast delivery or any other known or future known wireless delivery mechanism capable of wirelessly delivering the primary content across a wireless network 114. It is to be noted that broadcast or multicast delivery may provide significant benefits when simultaneously delivering a piece of primary content to a multitude of users. Similarly, secondary content distribution module 112 may provide for unicast delivery, broadcast delivery, multicast delivery or any other known or future known wireless delivery mechanism capable of wirelessly delivering the secondary content across the wireless network 114.

The wireless network 114 may comprise one or more of a Wireless LAN, a WWAN, a WPAN or the like. Furthermore, secondary content module 112 may provide for point-to-point delivery of secondary content through a temporary wired connection, like a docking station, connected to the content distribution system 108 or network 114.

Mobile device 116 generally includes an episodic secondary content manager 118, and a primary content manager 124. The primary content manager 124 coordinates presentation of primary content 126 which may be stored on the mobile device prior to presentation or streamed to the device during presentation The episodic secondary content manager 118 coordinates presentation of episodic secondary content items from an episodic secondary content set 120. The order in which episodic secondary content items are obtained from episodic secondary content set 120 is facilitated by an episodic manifest 122 which details the inter-relationships between the various episodes. The episodic manifest 122 may also comprise an index of secondary content items stored in the episodic secondary content set 120, and may be used to check for the presence of all or a predetermined portion of said items prior to presentation of an initial episodic secondary content item.

In operation, content providers 101 provide primary content 102 and episodic content 104 to content distribution system 108 via network 106. Content distribution system 108 transmits episodic secondary content set 120 and episodic manifest 122 to mobile device 116. In one aspect, the transmission is performed during a downtime in network 114 activity. In another aspect, the transmission is performed through docking the mobile device 116 in a docking station connected to network 114 and/or content distribution system 108. In one aspect, once a complete episodic secondary content set 120 is stored on the mobile device 116, the episodic secondary content may be accessed during a break in the presentation of primary content 126. A user is then be prompted, after completion of an episodic secondary content item, to make a selection of possible subsequent available secondary content items from the episodic secondary content set 120. Episodic secondary content manager 118 obtains a user selection and presents future secondary content based, at least in part, on the user selection.

Figure 2:
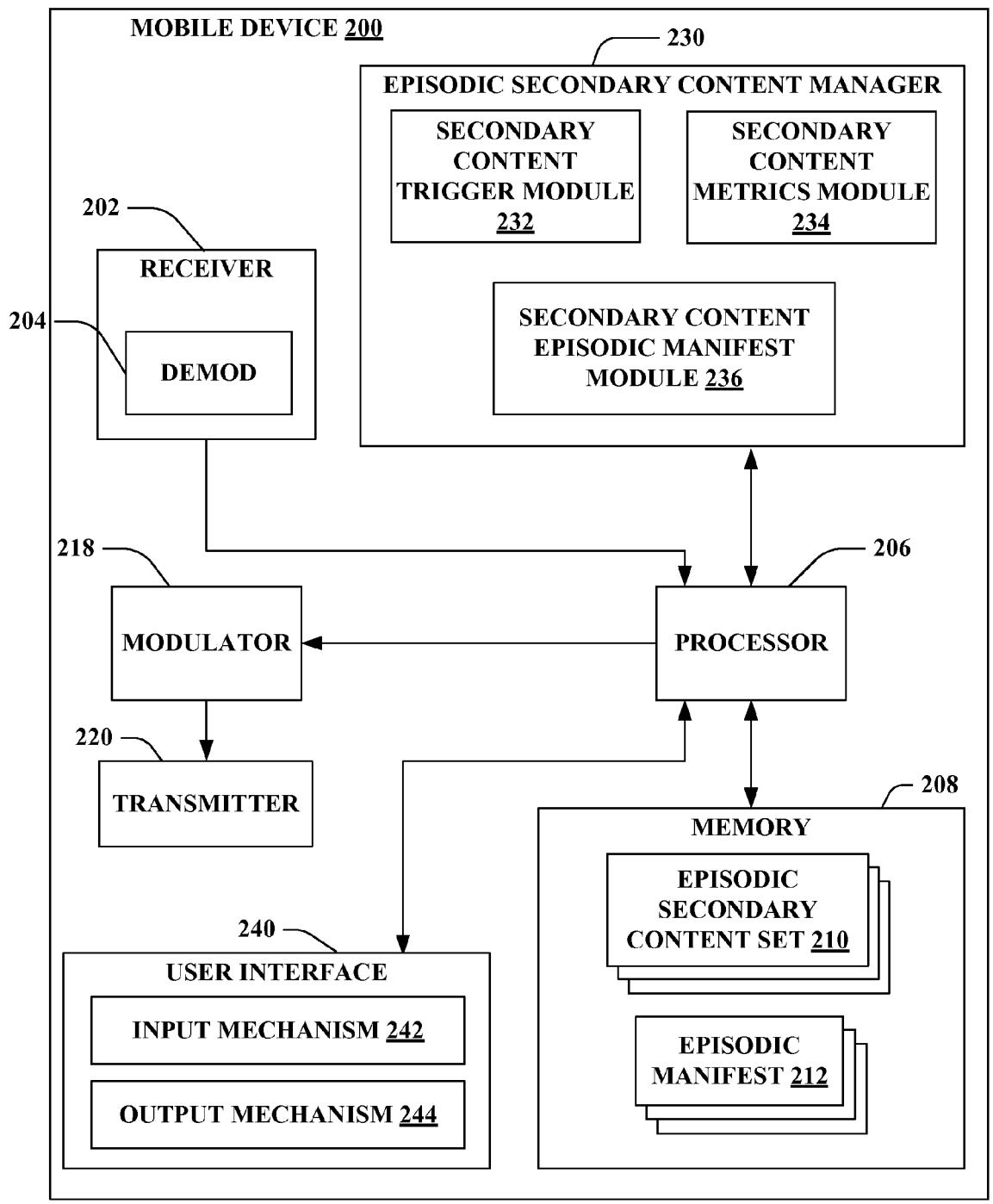
FIG. 2 is a block diagram example architecture of a Mobile Device.

While still referencing FIG. 1, but turning also now to FIG. 2, an example architecture of mobile device 116 is illustrated as a mobile device 200. As depicted in FIG. 2, mobile device 200 comprises a processor 206 that generally controls the operation of and the flow of data through the various components of mobile device 200. For example, the processor 206 analyzes information received by a receiver 202 and generates information for transmission by a transmitter 220.

The receiver 202 receives a signal from, for instance, a receive antenna (not shown), performs typical actions (e.g., filters, amplifies, downconverts, etc.) on the received signal, and digitizes the conditioned signal to obtain samples. Receiver 202 also includes a demodulator 204 that can demodulate received symbols and provide them to processor 206 for channel estimation.

Mobile device 200 additionally comprises memory 208 operatively coupled to processor 206 storing data to be transmitted, received data, information related to available channels, data associated with analyzed signal and/or interference strength, information related to an assigned channel, power, rate, or the like, and any other suitable information for estimating a channel and communicating via the channel. In one aspect, memory 208 can store an episodic secondary content set 210 and an episodic manifest 212. Furthermore, memory 208 may store primary content (not shown). Memory 208 can additionally store protocols and/or algorithms associated with estimating and/or utilizing a channel (e.g., performance based, capacity based, etc.).

It will be appreciated that the data store (e.g., memory 208) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 208 of the subject systems and methods may comprise, without being limited to, these and any other suitable types of memory.

Mobile device 200 further comprises an episodic secondary content manager 230 to facilitate presenting episodic secondary content on mobile device 200. Episodic secondary content manager 230 includes a secondary content trigger module 232 to assist episodic secondary content manager 230 in timing the presentation of the secondary content during a break in the primary content. In one aspect, a trigger message is sent with the primary content, to prepare the mobile device 200 for an upcoming break in the primary content, into which secondary content may be inserted. Secondary content trigger module 232 is operable to detect a break or other indicator associated with primary content, such as trigger message, of an opportunity to present secondary content. Episodic secondary content manager 230 further comprises secondary content metrics module 234 to assist episodic secondary content manager 230 in aggregating data corresponding to the presentation of secondary content, including, for example, whether the user made a selection, the secondary content items, the timing of the selection, whether the user halted playback during the presentation of secondary content and the like. Additionally, episodic secondary content manager 230 further includes a secondary content episodic manifest module 236 to assist episodic secondary content manager 230 in determining whether an episodic content set is ready for presentation and determining which episodic secondary content items may be presented to the user as available selections, etc.

Additionally, mobile device 200 includes a user interface 240. User interface 240 includes at least one input mechanism 242 for generating inputs into wireless device 200, and at least one output mechanism 242 for generating information for consumption by the user of the wireless device 200. For example, input mechanism 242 may include one or more of a set of keys, a mouse, a touch-screen display, a microphone, etc. Further, for example, output mechanism 244 may include one or more of a display, an audio speaker, a haptic feedback mechanism, a Personal Area Network (PAN) transceiver etc. In the example(s) discussed herein, the output mechanism 244 includes a display operable to present media content that is in image or video format and an audio speaker to present media content that is in an audio format.

In operation, episodic secondary content manager 230 is notified by secondary content trigger module 232 that a break in primary content presentation will occur. Episodic secondary content manager 230 then coordinates with secondary content episodic manifest module 236 to confirm episodic secondary content set 210 is ready for presentation. User interface 240 presents the episodic secondary content item and may receive a user selection relating to subsequent secondary content. Episodic secondary content manager 230 may then coordinate with secondary content metrics module 234 to aggregate the data corresponding to the user selection and the presented secondary content item. In one aspect, secondary content metrics module 234 may facilitate transmission of the aggregated data, via the network, to the distribution system, thereby providing feedback to content providers, such as but not limited to, user interest, secondary content success, etc.

Figure 3:
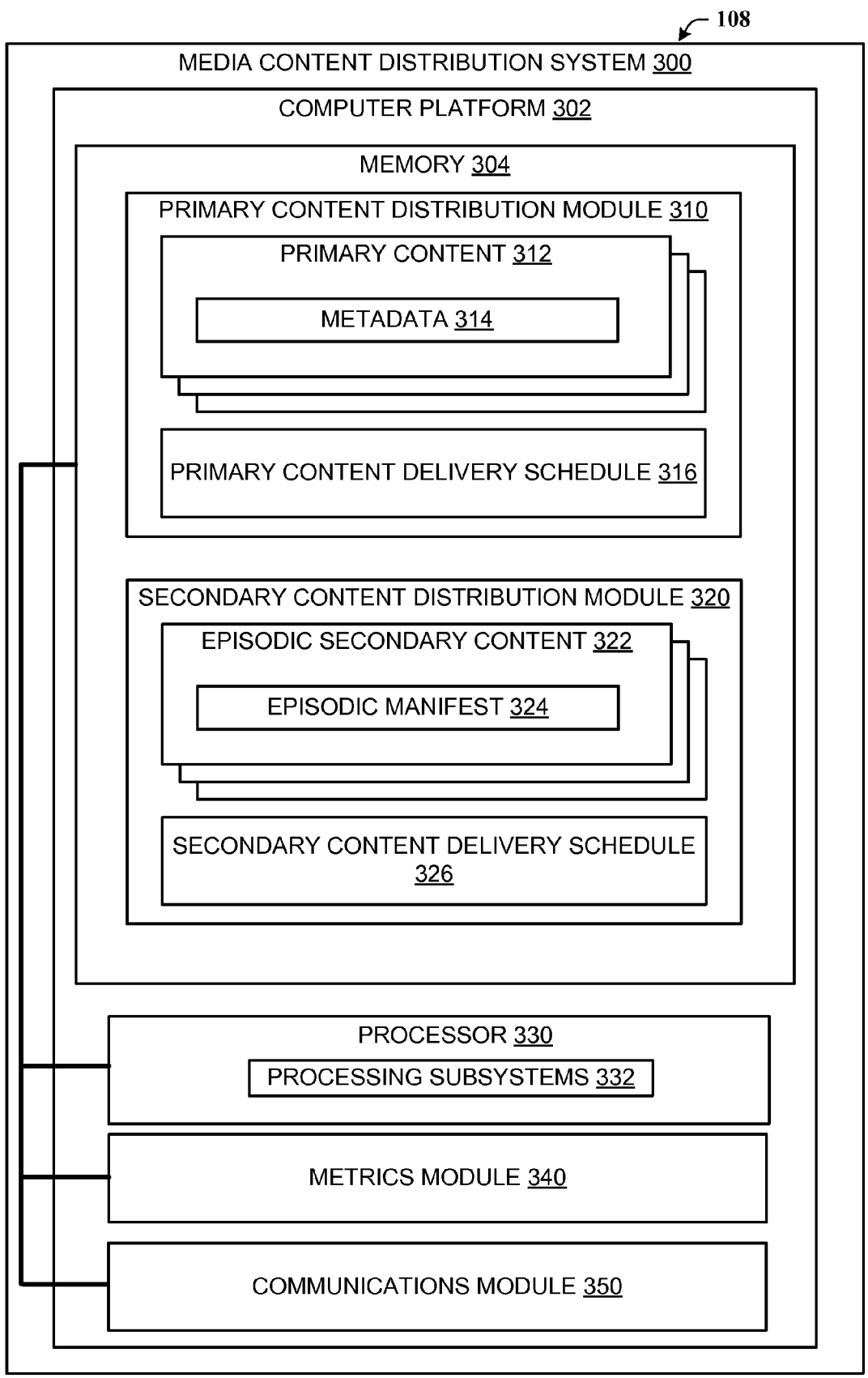
FIG. 3 is a block diagram example architecture of a Media Content Distribution System.

FIG. 3 is a detailed block diagram of a media content distribution system 300, such as the content distribution system 108 depicted in FIG. 1. The media content distribution system 300 may comprise at least one of any type of hardware, server, personal computer, mini computer, mainframe computer, or any computing device either special purpose or general computing device. Further, the modules and applications described herein as being operated on or executed by the media content distribution system 300 may be executed entirely on a single network device, as shown in FIG. 3, or alternatively, in other aspects, separate servers, databases or computer devices may work in concert to provide data in usable formats to parties, and/or to provide a separate layer of control in the data flow between the mobile devices 116 and the modules and applications executed by the media content distribution system 300.

The media content distribution system 300 includes computer platform 302 that can transmit and receive data across wired and wireless networks, and can execute routines and applications. Computer platform 302 includes a memory 304, which may comprise volatile and nonvolatile memory such as read-only and/or random-access memory (RAM and ROM), EPROM, EEPROM, flash cards, or any memory common to computer platforms. Further, memory 304 may include one or more flash memory cells, or may be any secondary or tertiary storage device, such as magnetic media, optical media, tape, or soft or hard disk. Further, computer platform 302 also includes a processor 330, which may be an application-specific integrated circuit ("ASIC"), or other chipset, logic circuit, or other data processing device. Processor 330 may include various processing subsystems 332 embodied in hardware, firmware, software, and combinations thereof, that enable the functionality of media content distribution system 300 and the operability of the network device on a wired or wireless network.

The memory 304 of media content distribution system 300 includes a primary content distribution module 310 that stores pieces of primary content 312. Each item of primary content 312 may includes associated metadata 314 that may include, but is not limited to, information such as when a break or breaks within the primary content may be presented. The primary content distribution module 310 also stores a primary content delivery schedule 316, such as a broadcast or multicast schedule for communicating the primary content 312 to the mobile devices 116. In one aspect, delivery of the primary content 312 may occur asynchronously during those times at which the wireless device is characteristically in an off state, such as late at night or in the early morning hours. As such delivery of the content may trigger the wireless device to "wake-up" (i.e., power-up) to receive the broadcasted or multicasted media content.

Additionally, the memory 304 of media content distribution system 300 includes a secondary content distribution module 320 that stores pieces of episodic secondary content 322. Each item of episodic secondary content 322 may include associated episodic manifest 324 that associates episodic secondary content 322 with one or more other episodic secondary content items in a logically contiguous manner. The secondary content distribution module 320 also includes a secondary content delivery schedule 326, such as a broadcast or multicast schedule for communicating the primary content 322 to the mobile devices 116. In one aspect, delivery of the episodic secondary content 322 may occur asynchronously during those times at which the wireless device is characteristically in an off state, such as late at night or in the early morning hours. As such delivery of the content may trigger the wireless device to "wake-up" (i.e., power-up) to receive the broadcasted or multicasted media content. In other aspects, the wireless device may request delivery of episodic secondary content 322 in accordance with unicast delivery or any other appropriate wireless delivery mechanism. In another aspect, the mobile device 116 may request delivery of secondary media content through a point-to-point link, such as, during docking of the mobile device 116 to an Internet accessible docking station.

The computer platform 302 further includes a communications module 350 embodied in hardware, firmware, software, and combinations thereof, that enables communications among the various components of media content distribution system 300, as well as between the media content distribution system 300, mobile devices 116, and content providers 101. The communication module 350 may include the requisite hardware, firmware, software and/or combinations thereof for establishing a wireless communication connection. According to described aspects, the communication module 350 may include the necessary hardware, firmware and/or software to facilitate wireless broadcast, multicast and/or unicast communication of primary content 312, and episodic secondary content 322.

The computer platform 302 further includes a metrics module 340 embodied in hardware, firmware, software, and combinations thereof, that stores metrics received from mobile device 116 corresponding to, among other things, interactions with episodic secondary content 322 items. In one aspect, media content distribution system 300 may analyze data in metrics module 340 to modify secondary content distribution schedule 326. For example, if the data in the metrics module 340 indicates a user is actively interacting with secondary content items, then the frequency with which secondary content items may be transmitted to the mobile device may be increased. Additionally, the cost per transmission, or the like, to the secondary content provider may be increased.

Figure 4:
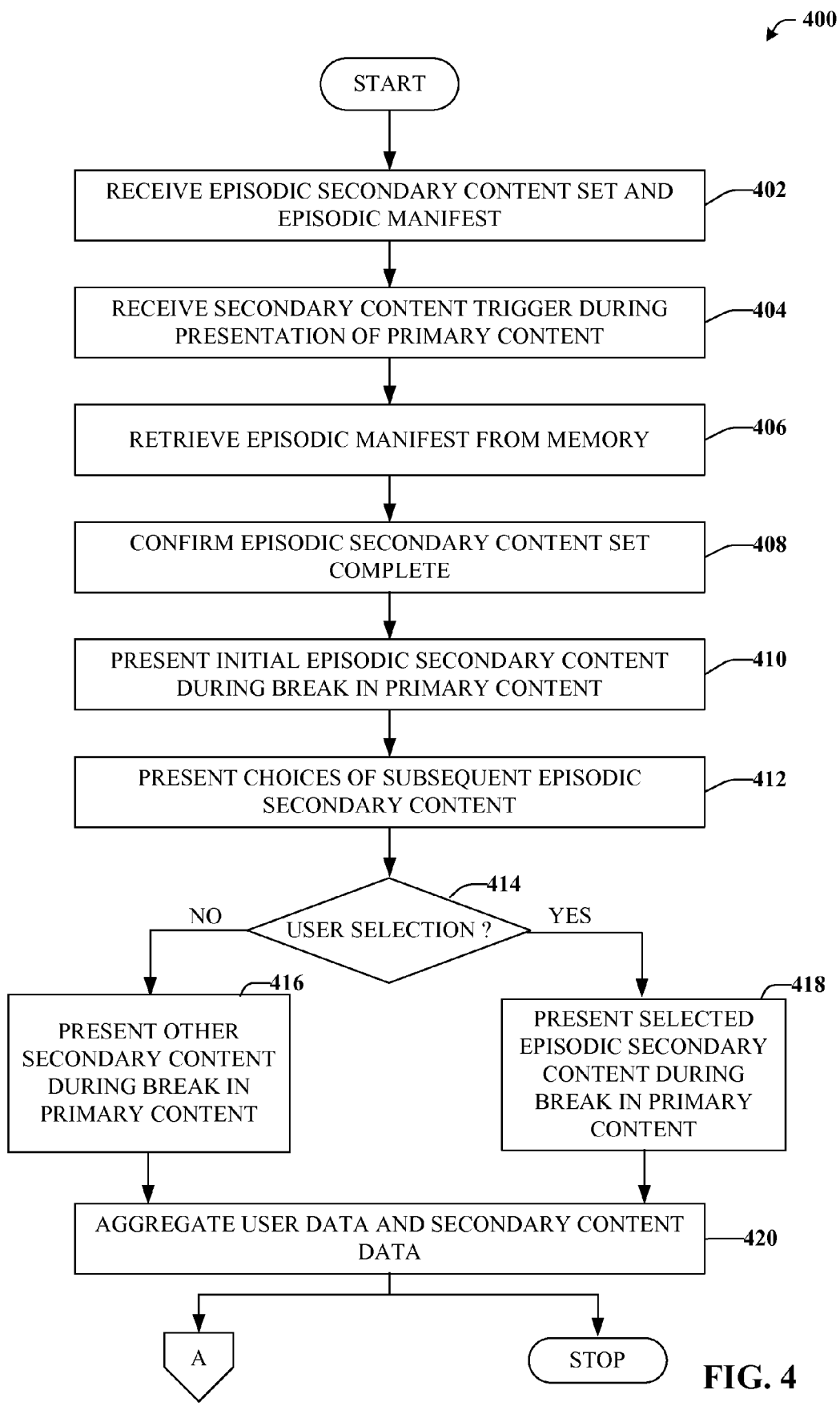
FIG. 4 is a flow diagram of a method for serving episodic secondary content in a mobile device.
Figure 5:
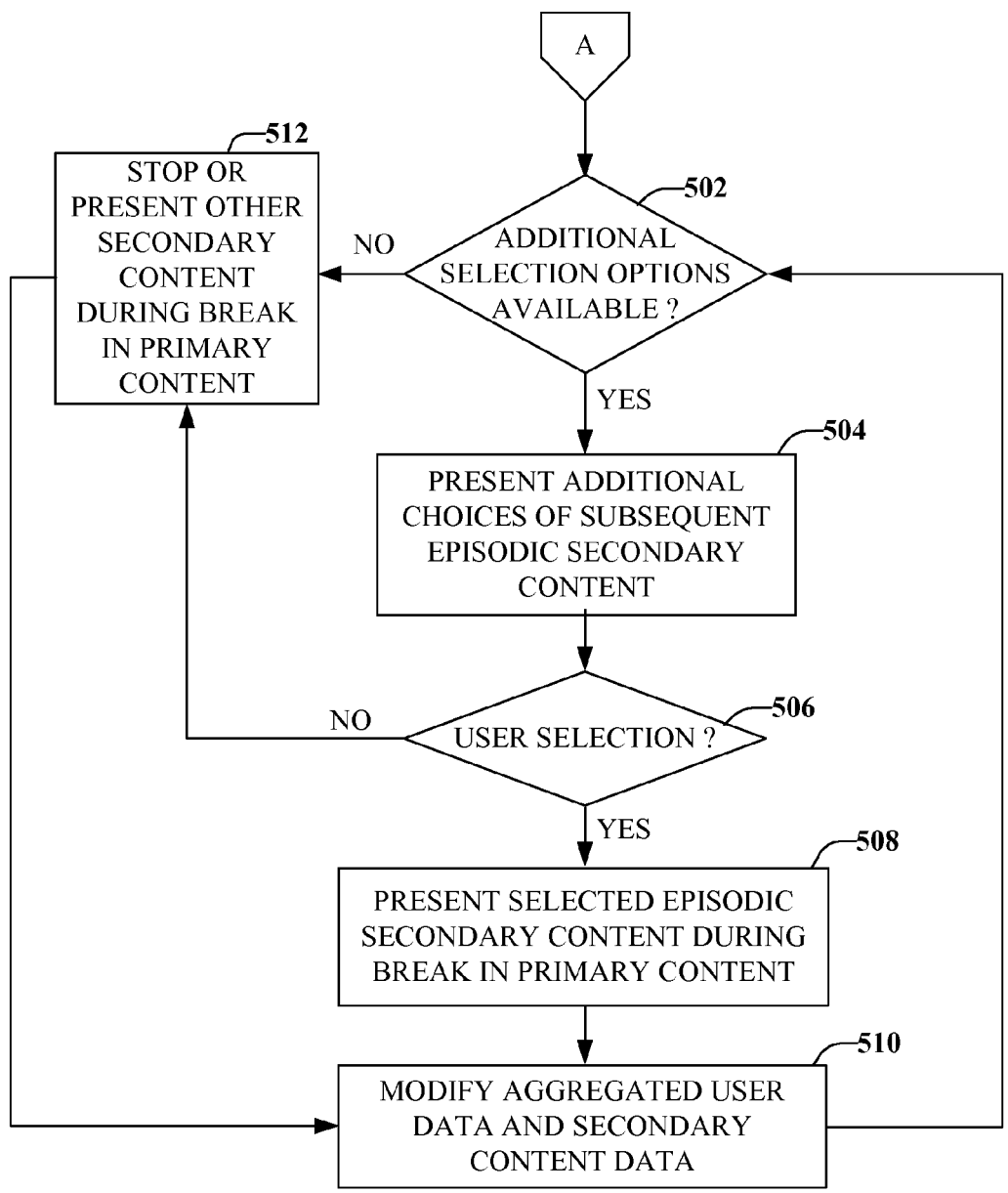
FIG. 5 is a flow diagram of a method for providing additional features in connection with serving episodic secondary content in a mobile device.

FIGS. 4 and 5 are flow charts of methods for distributing episodic content. While, for purposes of simplicity of explanation, the methods are shown and described as a series of acts, it is to be understood and appreciated that the invention is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention or the claimed subject matter. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 4, is a flowchart of a method 400 for serving episodic secondary content in a mobile device. At step 402, an episodic secondary content set and episodic manifest is received at a mobile device. In one aspect, the content set and manifest are received during a time at which the mobile device is characteristically in an off state, such as late at night or in the early morning hours. As such, delivery of the content may trigger the wireless device to "wake-up" (i.e., power-up) to receive the broadcasted or multicasted media content. In other aspects, the mobile device may request delivery of secondary content and manifest in accordance with unicast delivery or any other appropriate wireless delivery mechanism. In another aspect, the mobile device may request delivery of the secondary content and manifest through a point-to-point connection to a wired network, such as, during docking of the mobile device to an Internet accessible docking station.

At step 404, a secondary content trigger is received during presentation of a primary content item. The secondary content trigger provides the mobile device with information corresponding to when a break or breaks in the primary content will occur. At step 406 the mobile device retrieves an episodic manifest from memory. As noted above, the secondary content and manifest may be transmitted and stored on the mobile device prior to transmission and presentation of the primary content. At step 408, the episodic secondary content set is confirmed to include at least a minimum threshold number of items complete by checking the retrieved episodic manifest. For example, a minimum threshold of secondary content items may be determined by factors such as, but not limited to: the number of breaks in the primary content, user metrics and/or habits derived from prior interactions, the secondary content item story line length, etc.

At step 410, an initial episodic secondary content item is presented during a break. The break may, for example, be signaled by a secondary content trigger. After the initial episodic secondary content item is presented to substantial completion, at step 412, a user is provided choices corresponding to possible subsequent episodic secondary content available for presentation. For example, the user may be presented with additional storyline options to continue the material presented in the initial secondary content item. In one aspect, the user is presented with options relating to either or both of the primary content and initial secondary content. For example, a user may be presented with an option to view an additional side story relating to the primary content, wherein the side story is generated, at least in part, by the secondary content provider.

In step 414 a determination is made as to whether the user has made a selection from available secondary content items. If, in step 414 a user selection is detected, the method proceed to step 418 and episodic secondary content corresponding to the user selection is presented at a subsequent break in the primary content presentation. By contrast, if at step 414, a selection was not detected the method proceeds to step 416 and other secondary content, not related to the previously presented secondary content, is presented. For example, the other secondary content may include, but is not limited to: an initial episodic secondary content item associated with a different plurality of episodic secondary content items, such as the initial secondary content item presented at step 410; a default secondary non-episodic content item, etc.

Subsequent to either step 416 or 418, the method proceeds to step 420 and data corresponding to a user selection and/or non-selection is aggregated with data associated with the secondary content. Data associated with the secondary content may include data such as: an indication of which secondary content item was selected, an indication that no secondary content item was selected, an indication that the channel was switched during presentation of the secondary content item, an indication that use of the mobile device ceased prior to complete presentation of the secondary content item, etc. This information may be transmitted to a distribution system for further analyze at a subsequent time. In operation, this information may be used to provide feedback to content providers, such as but not limited to: user interest, secondary content success, etc.

FIG. 5 is a flowchart of a method 500 for providing additional features in connection with serving episodic secondary content in a mobile device. At step 502, a determination is made as to whether an episodic secondary content set has additional selection options available for presentation to a user. If, at step 502, insufficient additional secondary content is present, then the method stops, or some other secondary content is presented, as explained above, at step 512. By contrast, if a determination is made that there is sufficient episodic secondary content available for presentation to a user, the method proceeds to step 504 and a user is presented with choices corresponding to possible subsequent episodic secondary content available for presentation.

At step 506 a determination is made as to whether the user has made a selection from available secondary content items. If a user selection was made, the method proceeds to step 508 and episodic secondary content corresponding to the user selection is presented at a subsequent break in the primary content presentation. By contrast, if at step 506, a selection was not made, the method proceeds to step 512 and the method stops, or other secondary content, not related to the previously presented secondary content, is presented. For example, other secondary content may include, but is not limited to: an initial episodic secondary content item associated with a different plurality of episodic secondary content items; a default secondary non-episodic content item, etc. At step 510, data corresponding to a user selection and/or non-selection is aggregated with data associated with the secondary content. Presentation of episodic secondary content may continue at step 502 with a determination as to whether sufficient additional content is available for selection.

Figure 6:
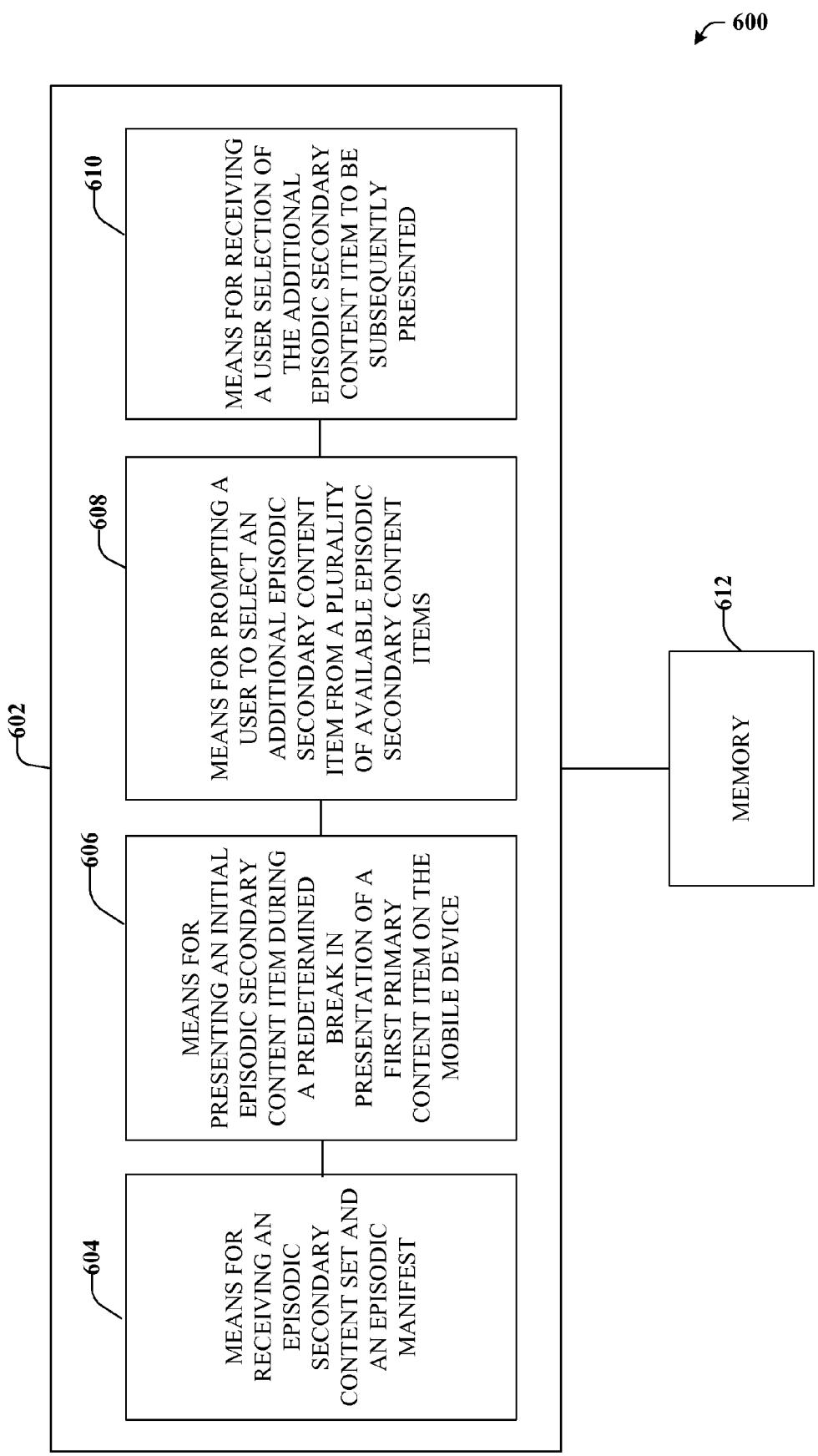
FIG. 6 depicts a block diagram of an exemplary mobile system that can facilitate serving episodic secondary content in a mobile device.

FIG. 6, is a block diagram of a system 600 that serves episodic secondary content in a mobile device. For example, system 600 can reside at least partially within a mobile device. According to another example aspect, system 600 can reside at least partially within an access terminal. It is to be appreciated that system 600 is represented as including functional blocks, which can be functional blocks that represent functions implemented by a processor, software, or combination thereof (e.g., firmware). System 600 includes a logical grouping 602 of means that can act in conjunction. For instance, logical grouping 602 can include means for receiving an episodic secondary content set and an episodic manifest 604. For example, episodic secondary content set, as described, can include a plurality of secondary content items logically leaked to at least one other of the plurality of secondary content items so that the set may be presented in parts with logical continuity. The episodic manifest may be used to assure the secondary content items are included in the episodic secondary content set and may be presented in an appropriate order and manner. Further, logical grouping 602 can comprise means for presenting an initial episodic secondary content item during a predetermined break in presentation of a primary content item on the mobile device 606. Thus, as described, a primary content item may signal to the wireless device that a break will shortly follow and in response to this signal the wireless device may present an initial episodic secondary content item. Further, logical grouping 602 can comprise means for prompting a user to select an additional episodic secondary content item from a plurality of available episodic secondary content items 608. For example, after the initial episodic secondary content item has been presented, a user may be prompted to select from a list of available secondary content items logically contiguous with the initial secondary content item for subsequent presentation on the wireless device. Further, logical grouping 602 can comprise means for receiving a user selection of the additional episodic secondary content item to be subsequently presented 610. As such, episodic secondary content may be presented to a user in a manner that allows the user to interact with and partially guide the presentation of the secondary content. Additionally, system 600 can include a memory 612 that retains instructions for executing functions associated with the means 604, 606, 608, and 610. While shown as being external to memory 612, it is to be understood that one or more of the means 604, 606, 608, and 610 can exist within memory 612.

Figure 7:
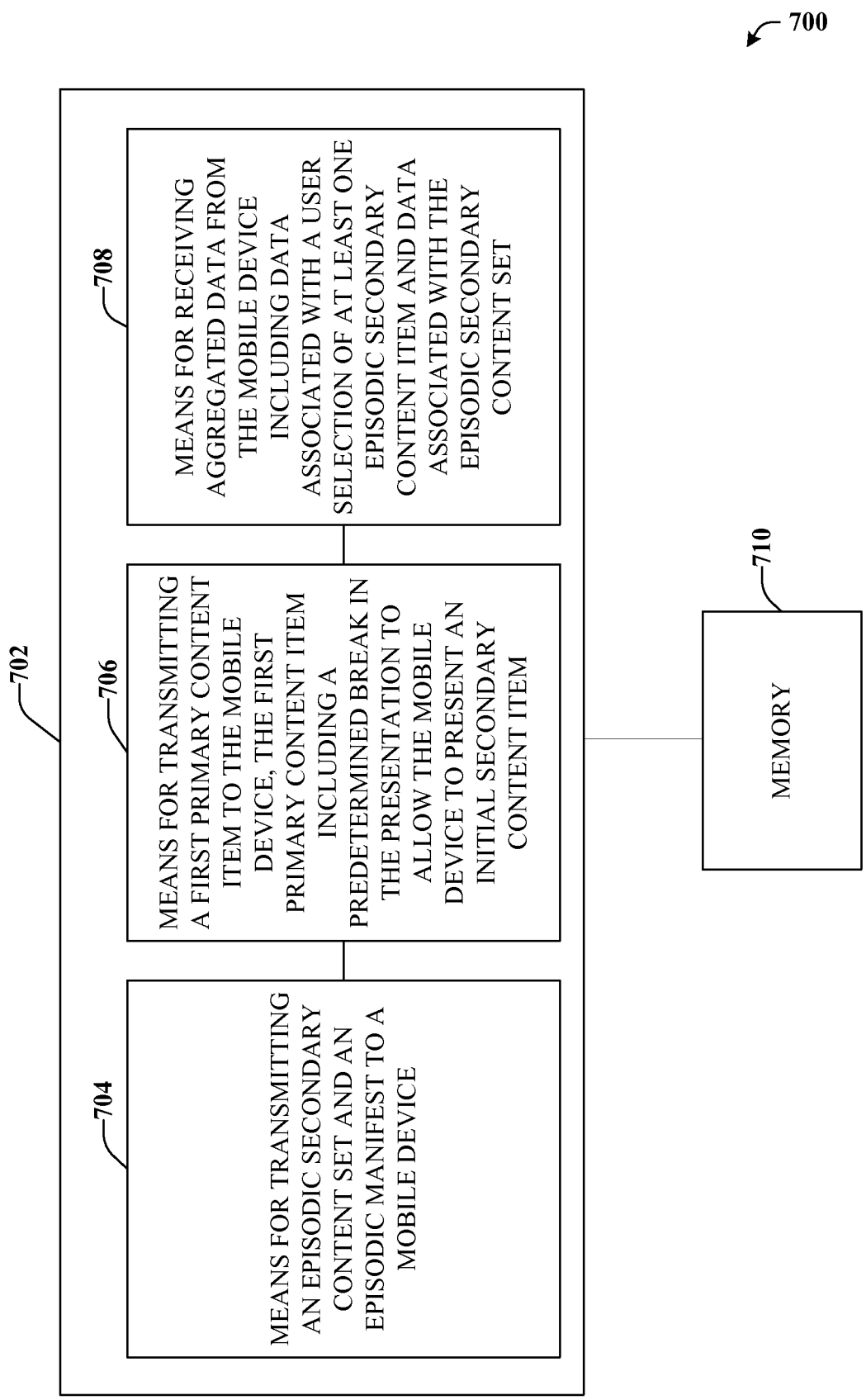
FIG. 7 depicts a block diagram of an exemplary content distribution system that can facilitate serving episodic secondary content to a mobile device.

With reference to FIG. 7, illustrated is a system 700 that provides episodic secondary content to a mobile device. For example, system 700 can reside at least partially within a base station, mobile device, etc. According to another example aspect, system 700 can reside at least partially within an access terminal. It is to be appreciated that system 700 is represented as including functional blocks, which can be functional blocks that represent functions implemented by a processor, software, or combination thereof (e.g., firmware). System 700 includes a logical grouping 702 of means that can act in conjunction. For instance, logical grouping 702 can include means for transmitting an episodic secondary content set and an episodic manifest to a mobile device 704. For example, the secondary content items may be transmitted through a broadcast, multicast, unicast, point-to-point connection, such as during docking of the mobile device, or the like. Further, logical grouping 702 can comprise means for transmitting a primary content item to the mobile device, the primary content item including a predetermined break in the presentation to allow the mobile device to present an initial secondary content item. For example, during presentation of a primary content item, a triggering signal may be sent to the mobile device to allow the mobile device to prepare for presentation of an episodic secondary content item. By way of example, and not limitation, the primary content may be transmitted through a broadcast, multicast, unicast, or the like. Additionally, in one aspect, the secondary content is stored on the mobile device and has been transmitted prior to the presentation of the primary content. Further, logical grouping 702 case comprise means for receiving aggregated data from the mobile data including data associated with a user selection of at least one episodic secondary content item and data associated with the episodic secondary content set. For example, data such: whether a user watched a secondary content item to completion; the selection, if any, the user made after viewing a secondary content item, and the like. In one aspect, the received aggregated data may be analyzed to allow a secondary content item provider to modify future content. In one aspect, the received aggregated data may be used to determine, at least in part, a fee structure for transmission of secondary content items to the mobile device, the frequency of transmission of episodic secondary content to the mobile device, or the like. As such, episodic secondary content may be transmitted to a mobile device in a manner that allows a user to interact with and partially guide the presentation of the secondary content. Additionally, system 700 can include a memory 710 that retains instructions for executing functions associated with the means 704, 706, and 708. While shown as being external to memory 710, it is to be understood that one or more of the means 704, 706, and 708 can exist within memory 710.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Furthermore, various aspects are described herein in connection with a terminal, which can be a wired terminal or a wireless terminal. A terminal can also be called a system, device, subscriber unit, subscriber station, mobile station, mobile, mobile device, remote station, remote terminal, access terminal, user terminal, terminal, communication device, user agent, user device, or user equipment (UE). A wireless terminal may be a cellular telephone, a satellite phone, a cordless telephone, a Session Initiation Protocol (SIP) phone, a wireless local loop (WLL) station, a personal digital assistant (PDA), a handheld device having wireless connection capability, a computing device, or other processing devices connected to a wireless modem. Moreover, various aspects are described herein in connection with a base station. A base station may be utilized for communicating with wireless terminal(s) and may also be referred to as an access point, a Node B, or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The techniques described herein may be used for various wireless communication systems such as CDMA, TDMA, FDMA, OFDMA, SC-FDMA and other systems. The terms "system" and "network" are often used interchangeably. A CDMA system may implement a radio technology such as Universal Terrestrial Radio Access (UTRA), cdma2000, etc. UTRA includes Wideband-CDMA (W-CDMA) and other variants of CDMA. Further, cdma2000 covers IS-2000, IS-95 and IS-856 standards. A TDMA system may implement a radio technology such as Global System for Mobile Communications (GSM). An OFDMA system may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM□, etc. UTRA and E-UTRA are part of Universal Mobile Telecommunication System (UMTS). 3GPP Long Term Evolution (LTE) is a release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, cdma2000 and UMB are described in documents from an organization named "3rd Generation Partnership Project 2" (3GPP2). Further, such wireless communication systems may additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Various aspects or features were presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Additionally, at least one processor may comprise one or more modules operable to perform one or more of the steps and/or actions described above.

Further, the steps and/or actions of a method or algorithm described in connection with the aspects disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some aspects, the processor and the storage medium may reside in an ASIC. Additionally, the ASIC may reside in a user terminal. In the alternative, the processor and the storage medium may reside as discrete components in a user terminal. Additionally, in some aspects, the steps and/or actions of a method or algorithm may reside as one or any combination or set of codes and/or instructions on a machine readable medium and/or computer readable medium, which may be incorporated into a computer program product.

In one or more aspects, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection may be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs usually reproduce data optically with lasers. Combinations of the above should also be included within the scope of computer-readable media.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. A method for serving episodic secondary content in a mobile device, the method comprising:
   receiving, in the mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;
   presenting an initial episodic secondary content item during a predetermined break in presentation of a primary content item on the mobile device;
   prompting a user of the mobile device to select an additional episodic secondary content item from the episodic secondary content set, the additional episodic secondary content item maintaining a logically contiguous story line of the initial episodic secondary content item;
   receiving a user selection of the additional episodic secondary content item to be presented during a subsequent predetermined break in presentation of the primary content item on the mobile device, wherein the user directs the logically contiguous story line from among various possible plot paths through the user selection of the additional episodic secondary content item that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

2. The method of claim 1 further comprising:
   receiving a trigger message during presentation of the primary content item, the trigger message indicating a forth coming break in presentation of the primary content item.

3. The method of claim 1 further comprising receiving the plurality of episodic secondary content items corresponding to the episodic secondary content set and the episodic manifest during a period when network activity is below a predetermined threshold level corresponding to a downtime in network activity.

4. The method of claim 1 further comprising receiving the plurality of episodic secondary content items and the episodic manifest through a network connection in response to coupling the mobile device to a docking station.

5. The method of claim 1 further comprising:
   storing the plurality of episodic secondary content items and the episodic manifest in cache memory coupled to the mobile device.

6. The method of claim 5, wherein presenting an initial episodic secondary content item comprises:
   determining if the episodic manifest index corresponds to the plurality of episodic secondary content items stored in the cache memory coupled to the mobile device; and
   upon a determination that an episodic manifest index corresponds to the plurality of episodic secondary content items, allowing presentation of the initial episodic secondary content item.

7. The method of claim 5 further comprising:
removing the at least one of the plurality of episodic secondary content items and the episodic manifest from the cache memory coupled to the mobile device after a predetermined triggering event.

8. The method of claim 7, wherein the predetermined trigger event includes at least one of:
a time duration defined by an episodic secondary content provider, or a number of presentations of an episodic secondary content item without receiving a user selection, or a presentation of an episodic secondary content item with receiving a user selection.

9. The method of claim 1, further comprising:
receiving the primary content item on the mobile device through at least one of a broadcast, or a multicast, or a unicast transmission from a content distribution system.

10. The method of claim 9, further comprising receiving the plurality of episodic secondary content items prior to presentation of the at least one primary content item.

11. The method of claim 1 further comprising:
aggregating data associated with the user selection and data associated with the plurality of episodic secondary content items; and
transmitting the aggregated data to a content distribution system.

12. The method of claim 3 further comprising:
determining if the initial episodic secondary content item was interrupted prior to complete presentation; and
upon a determination that the initial episodic secondary content item was interrupted prior to complete presentation, including data associated with the interruption with the aggregated data.

13. An apparatus for serving episodic secondary content, the apparatus comprising:
a processor;
a communications module of a mobile device coupled to the processor, wherein the communication module is configured to receive a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item; and
a user interface coupled to the processor, wherein the user interface is configured to:
present an initial episodic secondary content item during a predetermined break in presentation of a primary content item;
prompt a user of the mobile device to select an additional episodic secondary content item from the episodic secondary content set, the additional episodic secondary content item maintaining a logically contiguous story line of the initial episodic secondary content item; and
receive a user selection of the additional episodic secondary content item to be presented during a subsequent predetermined break in presentation of the primary content item, wherein the user directs the logically contiguous story line from among various possible plot paths through the user selection of the additional episodic secondary content item that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

14. The apparatus of claim 13, wherein the communications module is further configured to
receive a trigger message during presentation of the primary content item, the trigger message indicating a forth coming break in presentation of the primary content item.

15. The apparatus of claim 13, wherein the communications module is further configured to receive the plurality of episodic secondary content items corresponding to the episodic secondary content set and the episodic manifest during period when network activity is below a predetermined threshold level corresponding to a downtime in network activity.

16. The apparatus of claim 13 further comprising:
a docking station module,
wherein the communications module is further configured to receive plurality of episodic secondary content items and the episodic manifest through an internet connection established through an interaction with a docking station in response coupling the communication module to 17. The apparatus of claim 13 further comprising:
a memory management module for:
determining if an episodic manifest index corresponds to the plurality of episodic secondary content items stored in a cache memory coupled to the mobile device; and
upon a determination that the episodic manifest index corresponds to the plurality of episodic secondary content items, allowing presentation of the initial episodic secondary content item by the user interface.

18. The apparatus of claim 13 further comprising:
a cache memory module for storing the plurality of episodic secondary content items and the episodic manifest.

19. The apparatus of claim 18 further comprising:
a memory management module for removing at least one of the plurality of episodic secondary content items and the episodic manifest from the cache memory after predetermined triggering event.

20. The apparatus of claim 19, wherein the predetermined trigger event includes at least one of:
a time duration defined by an episodic secondary content provider, or
a number of presentations of an episodic secondary content item without receiving a user selection, or
a presentation of an episodic secondary content item with receiving a user selection.

21. The apparatus of claim 13, wherein the communications module is further configured to receive the primary content item on the mobile device through at least one of a broadcast, or a multicast, or a unicast transmission from a content distribution system.

22. The apparatus of claim 21, wherein the communications module is further configured to receiving the plurality of episodic secondary content items prior to reception of the at least one primary content item.

23. The apparatus of claim 13 further comprising:
a tracking module for aggregating data associated with the user selection and data associated with the plurality of episodic secondary content items; and
the communications module is further configured to transmit the aggregated data to a content distribution system. the docking station.

24. The apparatus of claim 15 further comprising:
a reporting module for
determining if the initial episodic secondary content item was interrupted prior to complete presentation; and
upon a determination that the initial episodic secondary content item was interrupted prior to complete presentation, including data associated with the interruption with the aggregated data.

25. At least one processor configured for serving episodic secondary content in a mobile device, the at least one processor comprising:
a first module for receiving, in the mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;
a second module for presenting an initial episodic secondary content item during a predetermined break in presentation of a primary content item on the mobile device;
a third module for prompting a user of the mobile device to select an additional episodic secondary content item from the episodic secondary content set, the additional episodic secondary content item maintaining a logically contiguous story line of the initial episodic secondary content item; and
a fourth module for receiving a user selection of the additional episodic secondary content item to be presented during a subsequent predetermined break: in presentation of the primary content item on the mobile device, wherein the user directs the logically contiguous story line from among various possible plot paths through the user selection of the additional episodic secondary content item that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

26. The at least one processor of claim 25 further comprising:
a module for receiving a trigger message during presentation of the primary content item, the trigger message indicating a forth coming break in presentation of the primary content item.

27. The at least one processor of claim 25 further comprising a module for receiving the plurality of episodic secondary content items corresponding to the episodic secondary content set and the episodic manifest during a period when network activity is below a predetermined threshold level corresponding to a downtime in network activity.

28. The at least one processor of claim 25 further comprising a module for receiving the plurality of episodic secondary content items and the episodic manifest through a network connection established through coupling the mobile device to a docking station in response coupling the mobile device to the docking station.

29. The at least one processor of claim 25 further comprising:
a module for storing the plurality of episodic secondary content items and the episodic manifest in cache memory coupled to the mobile device.

30. The at least one processor of claim 29 further comprising:
a module for removing the at least one of the plurality of episodic secondary content items and the episodic manifest from the cache memory coupled to the mobile device after a predetermined triggering event.

31. The at least one processor of claim 30, wherein the predetermined trigger event includes at least one of:
a time duration defined by an episodic secondary content provider, or
a number of presentations of an episodic secondary content item without receiving a user selection, or a presentation of an episodic secondary content item with receiving a user selection.

32. The at least one processor of claim 25 further comprising:
a module for aggregating data associated with the user selection and data associated with the plurality of episodic secondary content items; and
a module for transmitting the aggregated data to a content distribution system.

33. The at least one processor of claim 32, wherein the second module for presenting an initial episodic secondary content item comprises:
a module for determining if an episodic manifest index corresponds to the plurality of episodic secondary content items stored in a cache memory coupled to the mobile device; and
upon a determination that the episodic manifest index corresponds to the plurality of episodic secondary content items, a module allowing presentation of the initial episodic secondary content item.

34. The at least one processor of claim 32 further comprising:
a module for determining if the initial episodic secondary content item was interrupted prior to complete presentation; and
upon a determination that the initial episodic secondary content item was interrupted prior to complete presentation, a module for including data associated with the interruption with the aggregated data.

35. The at least one processor of claim 25, further comprising:
a module receiving the primary content item on the mobile device through at least one of a broadcast, or a multicast, or a unicast transmission from a content distribution system.

36. The at least one processor of claim 35, further comprising:
a module for receiving the plurality of episodic secondary content items prior to presentation of the at least one primary content item.

37. A non-transitory computer-readable storage medium having stored thereon software instructions configured to cause a processor of a mobile device to perform operations comprising:
receiving a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;

presenting an initial episodic secondary content item during a predetermined break in presentation of a primary content item;

prompting a user of the mobile device to select an additional episodic secondary content item from the episodic secondary content set, the additional episodic secondary content item maintaining a logically contiguous story line of the initial episodic secondary content item; and receiving a user selection of the additional episodic secondary content item to be presented during a subsequent predetermined break in presentation of the primary content item on the mobile device, wherein the user directs the logically contiguous story line from among various possible plot paths through the user selection of the additional episodic secondary content item that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

38. The non-transitory computer-readable storage medium of claim 37, wherein the stored software instructions are configured to cause a processor to perform operations further comprising receiving a trigger message during presentation of the primary content item, the trigger message indicating a forth coming break in presentation of the primary content item.

39. The non-transitory computer-readable storage medium of claim 37, wherein the stored software instructions are configured to cause a processor to perform operations further comprising receiving the plurality of episodic secondary content items corresponding to the episodic secondary content set and the episodic manifest during period when network activity is below a predetermined threshold level corresponding to a downtime in network activity.

40. The non-transitory computer-readable storage medium of claim 37, wherein the stored software instructions are configured to cause a processor to perform operations further comprising receiving the plurality of episodic secondary content items and the episodic manifest through a network connection established through coupling the mobile device to a docking station in response to coupling the mobile device to the docking station.

41. The non-transitory computer-readable storage medium of claim 37, wherein the stored software instructions are configured to cause a processor to perform operations further comprising:

storing the plurality of episodic secondary content items and the episodic manifest in cache memory coupled to the mobile device.

42. The non-transitory computer-readable storage medium claim 41, wherein the stored software instructions are configured to cause a processor to present an initial episodic secondary content item comprises stored software instructions configured to cause a processor to perform operations further comprising:

determining if an episodic manifest index corresponds to the plurality of episodic secondary content items stored in the cache memory coupled to the mobile device; and upon a determination that the episodic manifest index corresponds to the plurality of episodic secondary content items, allowing presentation of the initial episodic secondary content item.

43. The non-transitory computer-readable storage medium of claim 41, wherein the stored software instructions are configured to cause a processor to perform operations further comprising:

removing the at least one of the plurality of episodic secondary content items and the episodic manifest from the cache memory coupled to the mobile device after a predetermined triggering event.

44. The non-transitory computer-readable storage medium of claim 43, wherein the predetermined trigger event includes at least one of:

a time duration defined by an episodic secondary content provider, or a number of presentations of an episodic secondary content item without receiving a user selection, or a presentation of an episodic secondary content item with receiving a user selection.

45. The non-transitory computer-readable storage medium of claim 37, wherein the stored software instructions are configured to cause a processor to perform operations further comprising:

receiving the primary content item on the mobile device through at least one of a broadcast, or a multicast, or a unicast transmission from a content distribution system.

46. The non-transitory computer-readable storage medium of claim 45, wherein the stored software instructions are configured to cause a processor to perform operations further comprising:

receiving the plurality of episodic secondary content items prior to presentation of the at least one primary content item.

47. The non-transitory computer-readable storage medium of claim 37, wherein the stored software instructions are configured to cause a processor to perform operations further comprising:

aggregating data associated with the user selection and data associated with the plurality of episodic secondary content items; and transmitting the aggregated data to a content distribution system.

48. The non-transitory computer-readable storage medium of claim 47, wherein the stored software instructions are configured to cause a processor to perform operations further comprising:

determining if the initial episodic secondary content item was interrupted prior to complete presentation; and upon a determination that the initial episodic secondary content item was interrupted prior to complete presentation, including data associated with the interruption with the aggregated data.

49. An apparatus, comprising:

means for receiving, in a mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;

means for presenting an initial episodic secondary content item during a predetermined break in presentation of a primary content item on the mobile device;

means for prompting a user of the mobile device to select an additional episodic secondary content item from the episodic secondary content set, the additional episodic secondary content item maintaining a logically contiguous story line of the initial episodic secondary content item; and means for receiving a user selection of the additional episodic secondary content item to be presented during a subsequent predetermined break in presentation of the primary content item on the mobile device, wherein the user directs the logically contiguous story line from among various possible plot paths through the user selection of the additional episodic secondary content item that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

50. The apparatus of claim 49 further comprising:
means for receiving a trigger message during presentation of the primary content item, the trigger message indicating a forth coming break in presentation of the primary content item.

51. The apparatus of claim 49 further comprising means for receiving the plurality of episodic secondary content items corresponding to the episodic secondary content set and the episodic manifest during period when network activity is below a predetermined threshold level corresponding to a downtime in network activity.

52. The apparatus of claim 49 further comprising means for receiving the plurality of episodic secondary content items and the episodic manifest through a network connection established through coupling the mobile device to a docking station in response to coupling the mobile device to the docking station.

53. The apparatus of claim 49 further comprising:
means for storing the plurality of episodic secondary content items and the episodic manifest in cache memory coupled to the mobile device.

54. The apparatus of claim 53, wherein the means for presenting an initial episodic secondary content item comprises:
means for determining if an episodic manifest index corresponds to the plurality of episodic secondary content items stored in the cache memory coupled to the mobile device; and
upon a determination that the episodic manifest index corresponds to the plurality of episodic secondary content items, means for allowing presentation of the initial episodic secondary content item.

55. The apparatus of claim 53 further comprising:
means for removing the at least one of the plurality of episodic secondary content items and the episodic manifest from the cache memory coupled to the mobile device after a predetermined triggering event.

56. The apparatus of claim 55, wherein the predetermined trigger event includes at least one of:
a time duration defined by an episodic secondary content provider, or
a number of presentations of an episodic secondary content item without receiving a user selection, or
a presentation of an episodic secondary content item with receiving a user selection.

57. The apparatus of claim 49, further comprising:
means for receiving at least one primary content item on the mobile device through at least one of a broadcast, or a multicast, or a unicast transmission from a content distribution system.

58. The apparatus of claim 57, further comprising means for receiving the plurality of episodic secondary content items prior to presentation of the at least one primary content item.

59. The apparatus of claim 49 further comprising:
means for aggregating data associated with the user selection and data associated with the plurality of episodic secondary content items; and
means for transmitting the aggregated data to a content distribution system.

60. The apparatus of claim 59 further comprising:
means for determining if the initial episodic secondary content item was interrupted prior to complete presentation; and
upon a determination that the initial episodic secondary content item was interrupted prior to complete presentation, means for including data associated with the interruption with the aggregated data.

61. A method for providing episodic secondary content to a mobile device, the method comprising:
transmitting, to the mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;
transmitting a primary content item to the mobile device, the primary content item including a predetermined break in the presentation to allow the mobile device to present an initial episodic secondary content item; and
receiving aggregated data from the mobile device including data associated with a user selection of at least one of the plurality of episodic secondary content items and data associated with at least one of the plurality of episodic secondary content items, the at least one of the plurality of episodic secondary content items maintaining a logically contiguous story line of the initial episodic secondary content item, wherein the user directs the logically contiguous story line from among various possible plot paths through the user selection of the at least one of the plurality of episodic secondary content items that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

62. The method of claim 61 further comprising:
transmitting a trigger message during transmission of the primary content item, the trigger message indicating a forth coming break in presentation of the primary content item.

63. The method of claim 61 further comprising:
transmitting the plurality of episodic secondary content items corresponding to the episodic secondary content set and the episodic manifest during period when network activity with the mobile device is below a predetermined threshold level corresponding to a downtime in network activity.

64. The method of claim 61, wherein the aggregated data further includes data associated with an interruption of the initial episodic second content item, upon a determination that the initial episodic secondary content item was interrupted prior to complete presentation.

65. The method of claim 61 further comprising:
analyzing the aggregated data to determine user metrics; and
modifying a subsequent plurality of episodic secondary content items from the episodic secondary content set for transmission in response to the user metrics.

66. The method of claim 65, wherein modifying a subsequent plurality of episodic secondary content items from the episodic secondary content set transmission includes at least one of:
increasing a frequency of the plurality of episodic secondary content item transmissions in response to the user metrics indicating an interactive user, or
increasing a pricing structure for episodic secondary content provider in response to the user metrics indicating an interactive user.

67. An apparatus for providing episodic secondary content to a mobile device, the apparatus comprising:
a processor;
a communications module coupled to the processor, wherein the communication module is configured to:
transmit, to the mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;
transmit a primary content item to the mobile device, the primary content item including a predetermined break in the presentation to allow the mobile device to present an initial episodic secondary content item; and
receive aggregated data from the mobile device including data associated with a user selection of at least one of the plurality of episodic secondary content items and data associated with at least one of the plurality of episodic secondary content items, the at least one of the plurality of episodic secondary content items maintaining a logically contiguous story line of the initial secondary content item, wherein the user directs the logically contiguous story line from among various possible plot paths through the user selection of the at least one of the plurality of episodic secondary content items that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

68. The apparatus of claim 67, wherein the communications module is further configured to transmit a trigger message during transmission of the primary content item, the trigger message indicating a forth coming break in presentation of the primary content item.

69. The apparatus of claim 67, wherein the communications module is further configured to transmit the plurality of episodic secondary content items corresponding to the episodic secondary content set and the episodic manifest during period when network activity with the mobile device is below a predetermined threshold level corresponding to a downtime in network activity.

70. The apparatus of claim 67, wherein the communications module is further configured to include data associated with an interruption of the initial episodic second content item, upon a determination that the initial episodic secondary content item was interrupted prior to complete presentation.

71. The apparatus of claim 67 further comprising:
a user metrics module configured to:
analyze the aggregated data to determine user metrics; and
generate instructions to modify a subsequent plurality of episodic secondary content items from the episodic secondary content set for transmission in response to user metrics.

72. The apparatus of claim 71, wherein modifying a subsequent plurality of episodic secondary content items from the episodic secondary content set transmission includes at least one of:
increasing frequency of the plurality of episodic secondary content items transmissions in response to the user metrics indicating an interactive user, or
increasing a pricing structure for episodic secondary content provider in response to the user metrics indicating an interactive user.

73. At least one processor configured for providing episodic secondary content to a mobile device, the at least one processor comprising:
a first module for transmitting, to the mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;
a second module for transmitting a primary content item to the mobile device, the primary content item including a predetermined break in the presentation to allow the mobile device to present an initial episodic secondary content item; and
a third module for receiving aggregated data from the mobile device including data associated with a user selection of at least one of the plurality of episodic secondary content items and data associated with at least one of the plurality of episodic secondary content items, the at least one of the plurality of episodic secondary content items maintaining a logically contiguous story line of the initial secondary content item, wherein the user directs the logically contiguous story line from among various possible plot paths through the user selection of the at least one of the plurality of episodic secondary content items that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

74. The at least one processor of claim 73 further comprising:
a module for transmitting a trigger message during transmission of the primary content item, the trigger message indicating a forth coming break in presentation of the primary content item.

75. The at least one processor of claim 73 further comprising a module for transmitting the plurality of episodic secondary content items corresponding to the episodic secondary content set and the episodic manifest during period when network activity with the mobile device is below a predetermined threshold level corresponding to a downtime in network activity.

76. The at least one processor of claim 73, wherein the aggregated data further includes data associated with an interruption of the initial episodic second content item, upon a determination that the initial episodic secondary content item was interrupted prior to complete presentation.

77. The at least one processor of claim 73 further comprising:
a module for analyzing the aggregated data to determine user metrics; and
a module for modifying a subsequent plurality of episodic secondary content items from the episodic secondary content set for transmission in response to the user metrics.

78. The at least one processor of claim 77, wherein the module for modifying a subsequent plurality of episodic secondary content items from the episodic secondary content set transmission includes at least one of:
a module for increasing a frequency of the plurality of episodic secondary content item transmissions in response to the user metrics indicating an interactive user, or
a module for increasing a pricing structure for episodic secondary content provider in response to the user metrics indicating an interactive user.

79. A non-transitory computer-readable storage medium having stored thereon software instructions configured to cause a processor to perform operations comprising:
transmitting, to a mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;
transmitting a primary content item to the mobile device, the primary content item including a predetermined break in the presentation to allow the mobile device to present an initial episodic secondary content item; and
receiving aggregated data from the mobile device including data associated with a user selection of at least one of the plurality of episodic secondary content items and data associated with at least one of the plurality of episodic secondary content items, the at least one of the plurality of episodic secondary content items maintaining a logically contiguous story line of the initial secondary content item, wherein the user directs the logically contiguous story line from among various possible plot paths through the user selection of the at least one of the plurality of episodic secondary content items that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

80. The non-transitory computer-readable storage medium of claim 79, wherein the stored software instructions are configured to cause a processor to perform operations further comprising:
transmitting a trigger message during transmission of the primary content item, the trigger message indicating a forth coming break in presentation of the primary content item.

81. The non-transitory computer-readable storage medium of claim 79, wherein the stored software instructions are configured to cause a processor to perform operations further comprising:
transmitting the plurality of episodic secondary content items corresponding to the episodic secondary content set and the episodic manifest during period when network activity with the mobile device is below a predetermined threshold level corresponding to a downtime in network activity.

82. The non-transitory computer-readable storage medium of claim 79, wherein the aggregated data further includes data associated with an interruption of the initial episodic second content item, upon a determination that the initial episodic secondary content item was interrupted prior to complete presentation.

83. The non-transitory computer-readable storage medium of claim 79, wherein the stored software instructions are configured to cause a processor to perform operations further comprising:
analyzing the aggregated data to determine user metrics; and
modifying a subsequent plurality of episodic secondary content items from the episodic secondary content set for transmission in response to the user metrics.

84. The non-transitory computer-readable storage medium of claim 83, wherein the stored software instructions are configured to cause a processor to perform operations such that modifying a subsequent plurality of episodic secondary content items from the episodic secondary content set transmission includes at least one of:
increasing a frequency of the plurality of episodic secondary content item transmissions in response to the user metrics indicating an interactive user; and
increasing a pricing structure for episodic secondary content provider in response to the user metrics indicating an interactive user.

85. An apparatus, comprising:
means for transmitting, to a mobile device, a plurality of episodic secondary content items corresponding to an episodic secondary content set and an episodic manifest, each episodic secondary content item in the episodic secondary content set including at least some content that logically corresponds to every other episodic secondary content item in the episodic secondary content set, and the episodic manifest including indexes coupling at least two episodic secondary content items from the episodic secondary content set and details of inter-relationships between each episodic secondary content item;
means for transmitting a primary content item to the mobile device, the primary content item including a predetermined break in the presentation to allow the mobile device to present an initial episodic secondary content item; and means for receiving aggregated data from the mobile device including data associated with a user selection of at least one of the plurality of episodic secondary content items and data associated with at least one of the plurality of episodic secondary content items, the at least one of the plurality of episodic secondary content items maintaining a logically contiguous story line of the initial secondary content item, wherein the user directs the logically contiguous story line from among various possible plot paths through the user selection of the at least one of the plurality of episodic secondary content items that further develops the logically contiguous story line, wherein the episodic secondary content set includes a minimum threshold number of episodic secondary content items determined by factors including at least one of a number of breaks in the primary content item, user metrics, user habits and a length of the logically contiguous story line.

86. The apparatus of claim 42 further comprising:
means for transmitting a trigger message during transmission of the primary content item, the trigger message indicating a forth coming break in presentation of the primary content item.

87. The apparatus of claim 42 further comprising means for transmitting the plurality of episodic secondary content items corresponding to the episodic secondary content set and the episodic manifest during period when network activity with the mobile device is below a predetermined threshold level corresponding to a downtime in network activity.

88. The apparatus of claim 42, wherein the aggregated data further includes data associated with an interruption of the initial episodic second content item, upon a determination that the initial episodic secondary content item was interrupted prior to complete presentation.

89. The apparatus of claim 85 further comprising:
means for analyzing the aggregated data to determine user metrics; and
means for modifying a subsequent plurality of episodic secondary content items from the episodic secondary content set for transmission in response to the user metrics.

90. The apparatus of claim 89, wherein means for modifying a subsequent plurality of episodic secondary content items from an episodic secondary content set transmission includes at least one of:
means for increasing a frequency of the plurality of episodic secondary content item transmissions in response to the user metrics indicating an interactive user, or
means for increasing a pricing structure for episodic secondary content provider in response to the user metrics indicating an interactive user.

* * * * *